United States Patent
Buchholz et al.

(12)

(10) Patent No.: US 6,885,987 B2
(45) Date of Patent: Apr. 26, 2005

(54) METHOD AND APPARATUS FOR ENCODING AND DECODING PAUSE INFORMATION

(75) Inventors: Dale R. Buchholz, Palatine, IL (US); Bashar Jano, Algonquin, IL (US); Ira Gerson, Schaumburg, IL (US)

(73) Assignee: fastmobile, Inc., Rolling Meadows, IL (US)

( * ) Notice: Subject to any disclaimer, the term of this patent is extended or adjusted under 35 U.S.C. 154(b) by 213 days.

(21) Appl. No.: 09/780,916

(22) Filed: Feb. 9, 2001

(65) Prior Publication Data

US 2002/0111812 A1 Aug. 15, 2002

(51) Int. Cl.$^7$ ............................. G10L 11/06; H04J 3/06
(52) U.S. Cl. ................. 704/228; 704/215; 370/476; 370/435
(58) Field of Search ................... 704/201, 228, 704/210, 214, 215; 370/435, 476, 484

(56) References Cited

U.S. PATENT DOCUMENTS

| | | | | |
|---|---|---|---|---|
| 4,630,262 A | * | 12/1986 | Callens et al. | 370/435 |
| 5,220,565 A | * | 6/1993 | Wilson et al. | 370/349 |
| 5,615,214 A | * | 3/1997 | Chandos et al. | 370/349 |
| 5,870,394 A | * | 2/1999 | Oprea | 370/392 |

* cited by examiner

Primary Examiner—Abul K. Azad
(74) Attorney, Agent, or Firm—Gavrilovich, Dodd & Lindsey, LLP

(57) ABSTRACT

At an audio source, pause information is added to audio data, the combination of which is subsequently packetized. The resulting packets are transmitted to an audio destination via a network in which different packets may be subjected to varying levels of delay. At the audio destination, the pause information may be used to insert pauses at appropriate times to accommodate the occurrence of delays in packet delivery. In one embodiment, pauses are inserted based on a hierarchy of pause types. During pauses, audio filler information may be injected. In this manner, the effects of variable network delays upon reconstructed audio may be mitigated.

67 Claims, 3 Drawing Sheets

METHOD AND APPARATUS FOR ENCODING AND DECODING PAUSE INFORMATION

TECHNICAL FIELD

The present invention relates generally to communication systems and, in particular, to a method and apparatus for encoding and decoding pause information, especially with respect to digitized audio.

BACKGROUND OF THE INVENTION

Telecommunications systems, particularly packet-based systems, are well known in the art. While wired and wireless packet-based systems offer a variety of advantages, they pose certain challenges when used to deliver isochronous data, e.g., audio data. For example, one set of packets may traverse a network as quickly as possible in one instance and, at another time, the same set of packets may take longer to reach the destination due to access delays, errors in the transmission (and subsequent retransmission) or, particularly in the case of wireless networks, lack of coverage. A party listening to a transmitted audio (for example, speech) stream may hear unusual delays or dropouts if packets are delayed or lost, resulting in unnatural sounding audio and loss of continuity.

Several solutions have been proposed to prevent the loss of timely data delivery, particularly in audio applications. In the first class of solutions, significant amounts of audio data are buffered at the destination before starting playback. Thus, if delivery of audio data to the destination is subsequently delayed, a sufficient amount of data will already be available for reproduction thereby maintaining continuity. While this method can work, the amount of delay and memory required to buffer a sufficient amount of data (i.e., to outlast any anticipated delays) may be prohibitive.

The second class requires that quality of service mechanisms be built into the network used to convey the data and that quality of service contracts be negotiated between the source and network. The Reservation Protocol (RSVP), Differentiated Services and Integrated Services technology being developed by the Internet Engineering Task Force (IETF) are examples of how quality of service is introduced into a network. Upon acceptance of a contract, the network provider is bound to provide a certain level of throughput, end-to-end delay, delay variance and error rate performance. In this manner, a given data source is assured that it can transmit data at a certain rate, and the data destination is assured that it will receive the data in a timely manner. Relying on such quality of service mechanisms eliminates the need for large buffers at the destinations. However, all routing elements within the network along the path between the source and destination must implement the quality of service mechanisms. This adds to the cost of implementing the network and, consequently, to the per unit cost of delivering the data. Thus, a technique that accommodates the performance variations inherent in packet-based networks and that avoids the problems associated with prior art solutions would represent an advancement of the art.

SUMMARY OF THE INVENTION

The present invention provides a technique for mitigating the effects of network delays on reconstructed audio through the use of pause information added to the transmitted digitized audio signal. The present invention is particularly applicable to text-to-speech (TTS) server arrangements. In accordance with the present invention, pause information is derived from analysis of an audio signal or, in the TTS scenario, from analysis of text input. The pause information is subsequently added to the digitized audio signal. In the TTS scenario, the audio signal is synthesized speech. In one embodiment of the present invention, different types of pauses are identified. The pause information preferably comprises ordered sets or tuples, each comprising a pause type and a pointer to a pause location within the audio data. The audio data and the corresponding pause information are then assembled into finite length packets. Preferably, the packets are formed such that the packets start and end on pause boundaries, if possible.

When reconstructing the received audio data, the pause information may be used to insert pauses at appropriate times to accommodate the occurrence of delays in delivering the packets. In one embodiment, pauses are inserted based on a hierarchy of pause types. For example, if a buffer of marked speech includes pointers for word, phrase and sentence boundaries, pauses are more naturally introduced at major boundaries, i.e., sentence and phrase, when network performance is varying greatly. During pauses, audio filler information, such as reporting messages or comfort audio, may be injected. Furthermore, mechanisms are provided for deciding when a segment of audio data is obsolete and can therefore be ignored. Playback will continue subsequent to that segment. Further still, the pause information may be used to control what types of audio are reconstructed and what types may be ignored. These and other advantages will be apparent from the detailed description that follows.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

Figure 1:
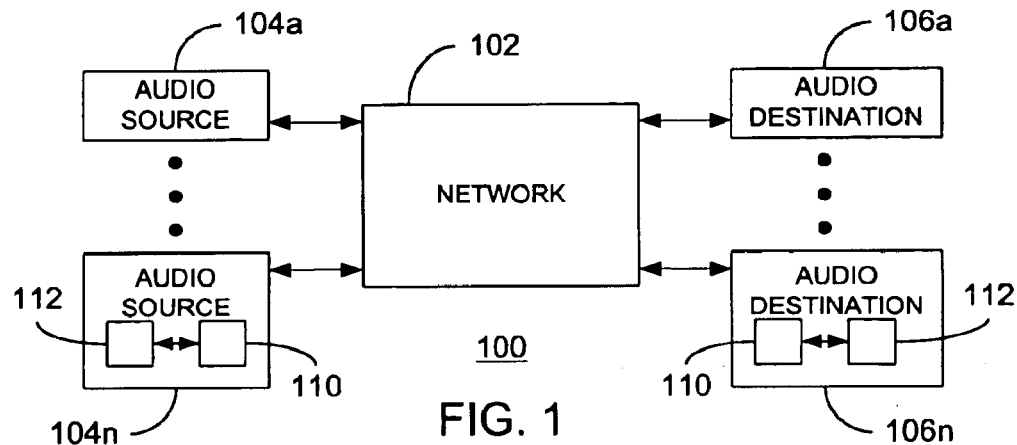
FIG. 1 is a block diagram of a communications system that may benefit from application of the present invention.

The present invention may be more fully described with reference to FIGS. 1–6. FIG. 1 illustrates a communication system 100 comprising a plurality of audio sources 104 in communication with a plurality of audio destinations 106 via a network 102. In a preferred embodiment, the network 102 is a packet-based network in which data conveyed therein is subject to varying levels of delivery delays. The network 102 may comprise any combination of wired or wireless networks. As such, the audio sources 104 and the audio destinations 106 may be coupled to the network 102 via wired (e.g., telephone or cable lines) or wireless paths. The communication paths within the network, i.e., between routing points, may similarly be wired or wireless paths. Furthermore, the network 102 may comprise any combination of a public network, such as the Internet or World Wide Web, and a private network. Preferably, each audio source 104 and audio destination 106 is separately addressable within the network 102. Such packet-based networks are well known to those having ordinary skill in the art and need not be described in greater detail here.

Each of the audio sources 104 provides, at a minimum, audio data or digitized audio and pause information corresponding thereto for delivery to one or more audio destinations 106. Preferably, each audio source 104 separates the audio data and corresponding pause information into finite-length packets for transmission over the network 102. In a presently preferred embodiment, each of the audio sources 104 comprises an audio server such that requests are received via the network and serviced or otherwise responded to by the audio servers. A suitable platform for implementing such an audio server is a Windows/NT or Sun Solaris workstation. As shown, each audio source 104 comprises a processor 110 such as a microprocessor, microcontroller, digital signal processor or the like or combinations thereof coupled to memory 112 such as volatile or non-volatile, electrical or magnetic storage devices. In a typical implementation, the memory 112 comprises stored instructions that are executed by the processor 110. Operational variables, used by the processor 110 when executing the stored instructions, are also typically stored in the memory 112. Additionally, each audio source 104 comprises interface circuitry (not shown) that allows the audio source to communicate with the network 102. In a preferred embodiment described in greater detail below, one or more of the audio sources 104 may comprise a text-to-speech (TTS) server that converts text data to voice or speech data. In general, the particular implementation of the audio sources 104 is a matter of design choice, and the present invention is not limited in this regard.

Each of the audio destinations 106 is capable of receiving and decoding the packets generated by the audio sources 104. In particular, and as described in greater detail below, each of the audio destinations 106 processes the transmitted audio data to reconstruct an audio signal for playback to a user of the audio destination. Furthermore, each audio destination 106 can recognize the occurrence of a condition in which continued delivery of the audio data is interrupted or delayed. As a result, each audio destination can insert pauses in the reconstructed audio based on the pause information included in each transmitted packet. As with the audio sources 104, each audio destination 106 comprises a processor 110, such as a microprocessor, microcontroller, digital signal processor or the like or combinations thereof coupled to memory 112, such as volatile or non-volatile, electrical or magnetic storage devices. In a typical implementation, the memory 112 comprises stored instructions that are executed by the processor 110. Additionally, operational variables, manipulated by the processor 110 when executing the stored instructions, are also typically stored in the memory 112. In a presently preferred embodiment, each of the audio destinations 106 comprises an audio client capable of transmitting requests for audio data via the network 102 to the audio servers 104. Typically, an audio client is implemented as an application process executed by an underlying processing platform. For example, the audio destination labeled 106a may comprise a personal computer having an audio client application operating thereon. In a presently preferred embodiment, one or more of the audio destinations 106 comprises a wireless communication device, e.g., a cell phone or the like, capable of communicating with a communication infrastructure, i.e., the network 102. The present invention is not limited by the particular hardware implementation of the audio destinations 106.

Figure 2:
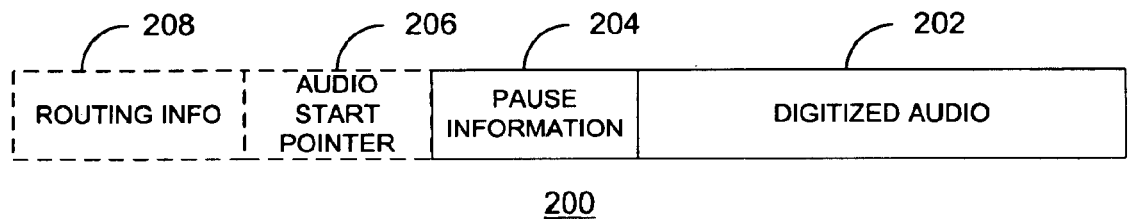
FIG. 2 illustrates a preferred packet format in which pause information is added to digitized audio data in accordance with the present invention.

As noted above, audio sources in accordance with the present invention generate packets comprising digitized audio data and pause information relating to the digitized audio. A preferred embodiment for packets in accordance with the present invention is illustrated in FIG. 2. In particular, each packet 200 preferably comprises digitized audio 202 and pause information 204. As shown, the pause information 204 is pre-pended to the digitized audio 202 as a header. This technique is preferred because the digitized audio 204 may then be derived from any source, i.e., recorded audio or speech, text-to-speech generators, etc. However, it is understood that the pause information 204 may be appended at the end of the digitized audio 202, or even interspersed within the digitized audio 202. In this latter case, it is anticipated that unique escape codes (for example, three consecutive bytes of zeros) could be placed within the digitized audio to precede the occurrence of any pause information, which pause information would correspond to a subsequent portion of the digitized audio.

Regardless, in the preferred embodiment in which the pause information is added as a header to the digitized audio, an audio start pointer 206 may optionally be appended. The audio start pointer 206 points to the first octet of the digitized audio 202. A value of zero for the start pointer 206 indicates that the packet does not include any digitized speech. A value of one indicates that there is no pause information included in the packet. This would be the case, for example, where the digitized audio is representative of a single syllable of a word and therefore not readily susceptible to the inclusion of a pause. Preferably, packets in accordance with the present invention are constructed in a manner such that the digitized audio 202 begins and ends on pause boundaries, if possible. As noted above, exceptions can occur when, for example, the speech signal representative of a spoken word is longer than a packet. In that case, the first packet of the word starts with a pause and the last packet ends with a pause; the intermediate packets have no pauses. In the preferred embodiment, the pause information 204 must point to a pause at the end of a packet to indicate when an audio element ends on a packet boundary.

The packet 200 may also optionally include routing information 208. The routing information 208 may be added to the beginning or the end of the packet by the underlying transport mechanisms. For example, the packet 200 may include TCP/IP or UDP/IP headers and trailers in order to traverse the network. Those having ordinary skill in the art will recognize that the particular form of routing information 208 added to the packet 200 is a matter of design choice, typically dependent upon the underlying transport technologies used.

At a minimum, the pause information 204 denotes where pauses occur in the associated digitized speech 202. Pauses are the breaks that either naturally occur or are inserted within an audio stream. A particular subclass of audio signals is speech signals. In the context of speech signals, pauses naturally occur between words, phrases, sentences, paragraphs, etc. Where a TTS server is used to provide the digitized audio 202, the pauses may be readily identified based on analysis of the input text string. For example, the spaces between individual words are marked as word pauses, a comma results in a phrase pause, and a period, exclamation point or question mark results in a sentence pause. In essence, the TTS server parses the input text string looking for pause indications and marks the digitized speech stream where the pauses occur according to the application semantics and the context and meaning of the text.

Figure 3:
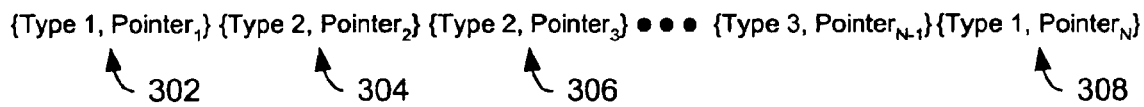
FIG. 3 illustrates a preferred format for representing the pause information in accordance with the present invention.

In a preferred embodiment, the pause information consists of a tuple {type, pointer} for each pause marked. This is illustrated in FIG. 3, where N tuples are shown. The pointer is an offset value, preferably relative to the beginning of the digitized audio, that indicates where a pause occurs within the digitized audio. The set of pause types includes, but is not limited to speaker pauses, topic pauses, heading pauses, paragraph pauses, sentence pauses, phrase pauses, word pauses, end pauses and live audio pauses. Live audio pauses correspond to periods of silence detected during live audio. While this does not indicate a pause context like some of the other pause types (e.g., word, sentence, speaker, etc. pauses), the occurrence of silence represents a convenient place to mark pauses. The end pauses are provided because the length of pause inserted at the end of a collection of sentences (e.g., a paragraph, etc.) may be different than a pause between sentences. For example, the algorithm on the decoder side used to hunt for an appropriate place to pause (see discussion below regarding FIG. 6) may decide to not introduce a pause if an end-type pause is currently found later in the receive buffer. The word, phrase, sentence, paragraph and heading pauses derive from standard documentation concepts. Word pauses are derived from spaces between words. Phrase pauses are derived from punctuation between words, such as commas, semi-colons and colons. Sentence pauses are derived from sentence-ending punctuation, such as periods, exclamation points and question marks. Paragraph pauses are derived from paragraph marks. Heading pauses are derived from formatting and spacing indicia. Topic and speakers pauses are more indicative of spoken dialogues and represent context information. During the course of a conversation, speakers and topics change. These are natural places to introduce pauses in the playback. In the case of TTS, several types of indicia may be used to detect such places. For example, in a Q&A scenario, the question is often differentiated by Q: or speaker initials, e.g., DB, CM, or by typeface change. Thus, a pause would be introduced after a question (speaker change) or after the answer (topic change assuming each question introduces a new topic). In the case of recorded audio, an edit function introduces speaker and topic markers at the discretion of the editor. Those having ordinary skill in the art will appreciate that other methods for identifying topic and speaker pauses may be used. The above set of pause types is oriented towards spoken and written English. Similar sets can be derived for other languages. This technique could also be used with other audio streams other than those derived from text. Note that it is not necessary to identify where all pauses occur. Rather, it may be desirable to identify only certain types of pauses when assembling the pause information. Regardless, in a preferred embodiment, the type and pointer data are encoded in 4 bits and 12 bits, respectively. This allows for 16 pause types and digitized speech of up to 4096 octets. Of course, encodings of other bit lengths can be easily used as a matter of design choice.

Figure 4:
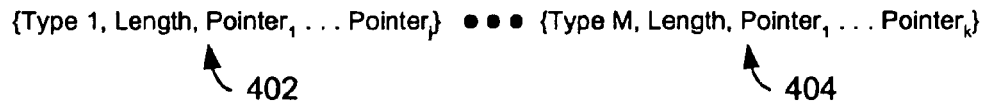
FIG. 4 illustrates an alternative format for representing the pause information in accordance with the present invention.

In the preferred embodiment, the tuples are collected and ordered according to order of occurrence. The pause that occurs first has its pause information first in the header 204. This is illustrated in FIG. 3, where the pointer (Pointer$_1$) for the first tuple 302 points to a location closest to the beginning of the digitized audio 202. Conversely, the pointer (Pointer$_N$) for the N$^{th}$ tuple 308 points to a location closest to the end of the digitized audio 202. As shown in FIG. 3, the first 302 and the N$^{th}$ tuple 308 comprise pause types corresponding to "Type 1", so labeled for illustrative purposes only. Additionally, a second tuple 304 and third tuple 306 comprise a "Type 2" pause type. The examples illustrated in FIG. 3 are specific occurrences illustrating the more general principle that, in the preferred embodiment, any of the various pause types may be included in any of the tuples. However, other embodiments are possible. For example, an alternative embodiment is illustrated in FIG. 4 in which each pause type is associated with one or more pointers to pauses of that type. Thus, the tuples take the form of {type, length, set of pointers}. The length parameter indicates the number of pointers associated with that pause type. In the examples shown, it is assumed that there are M different pause types. Thus, for the first pause type included in the first tuple 402, the length parameter indicates that there are j pointers in the tuple, followed by the pointers themselves. Additionally, for the M$^{th}$ pause type included in the M$^{th}$ tuple 404, the length parameter indicates that there are k pointers in the tuple, followed by the pointers themselves. Note that j does not have to be equal to k. Furthermore, in the simple case where there are no pauses in the digitized audio for a given pause type, there is no need to include a tuple corresponding to that pause type. Alternatively, the tuple for that pause type could comprise a length of zero. Further note that the pointers in this embodiment are not necessarily sequentially ordered. That is, the first pointer (Pointer$_1$) corresponding to the first tuple 402 may actually point to a location within the digitized audio that occurs after the first pointer (Pointer$_1$) for the M$^{th}$ tuple 404. Regardless, those having ordinary skill in the art will appreciate that the encoding of pause types and pointers can take many forms, including large field size to accommodate more pause types or longer packets, a bit map for the types such that a type might have several characteristics, e.g., word plus phrase.

Figure 5:
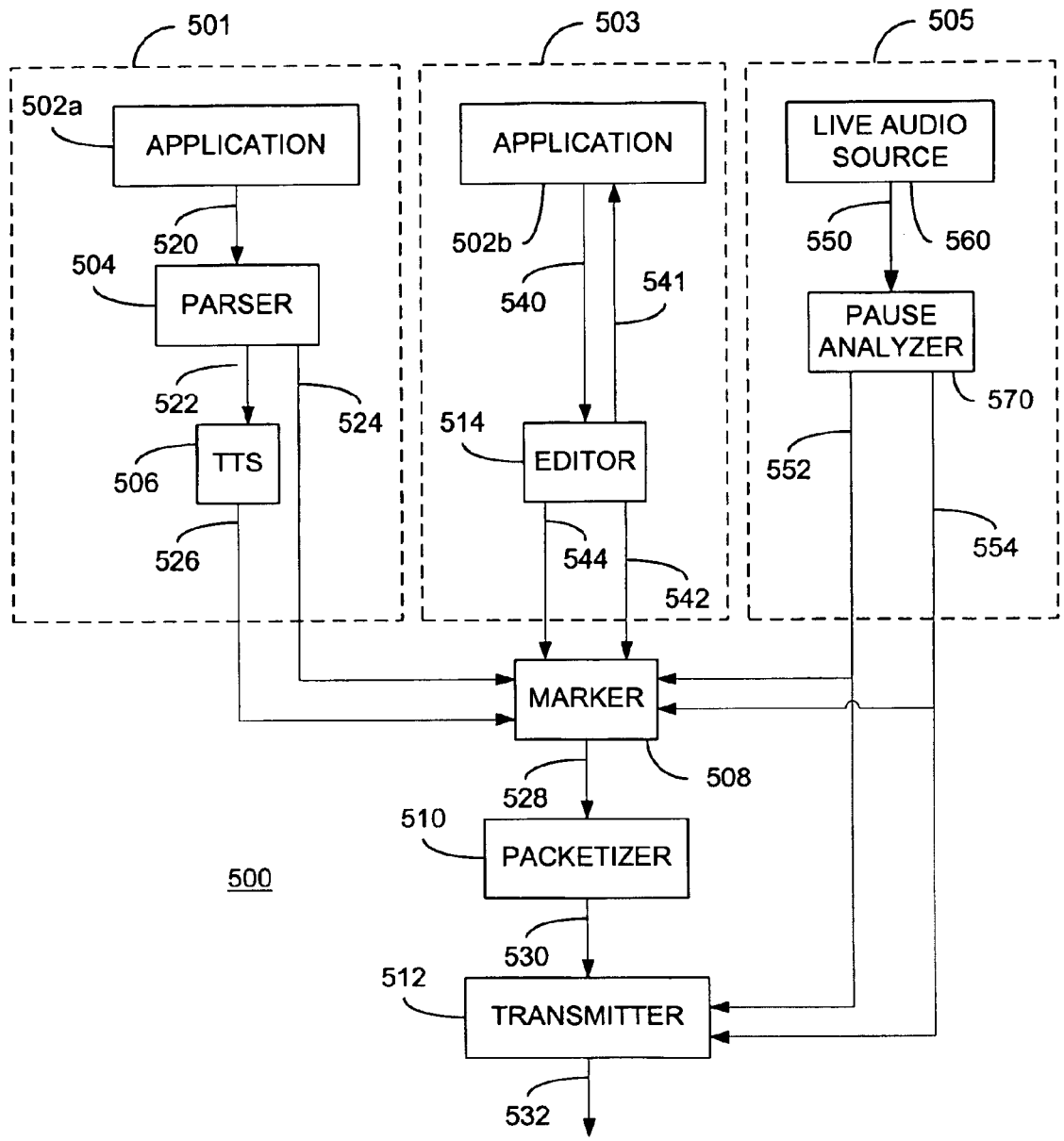
FIG. 5 is a block diagram of an encoding apparatus in accordance with the present invention.

Referring now to FIG. 5, an apparatus for encoding digitized audio in accordance with the present invention is illustrated. The encoder 500 is included in each of the audio sources 104. Based on the operation of the encoder 500 described below, those having ordinary skill in the art will recognize that the encoder 500 may be implemented in software, hardware or a combination of both as a matter of design choice. Furthermore, various ones of the functional elements shown in FIG. 5 may be combined together, or even further subdivided, or may not be present, as a matter of design choice. The encoder 500 comprises audio and pause information sources 501, 503, 505 coupled to a marker 508. Three particular types of audio and pause information sources are illustrated in FIG. 5. However, in general, any source that is capable of analyzing input data representative of audio information and providing pause information corresponding thereto may serve in this capacity. The marker 508 assembles the pause information 524, 542, 552 and ensures that it is properly correlated with the audio data 526, 544, 554 from which it was derived by storing the audio data as it is provided in a first intermediate buffer, and similarly storing the corresponding pause information in a second intermediate buffer, with links between each pause in the second intermediate buffer to an appropriate location in the first intermediate buffer. The resulting marked audio data 528 is provided to a packetizer 510. As noted above, the packetizer attempts to create packets with pauses at either end of the packet. Preferably, the packetizer tries to maximize packet length. To this end, the packetizer looks in the first intermediate buffer for the first pause immediately prior to the maximum data length. It then places the data from the beginning of the first intermediate buffer to the identified pause into the packet, and then copies the relevant pause information from the second intermediate buffer into the packet header, making any necessary pointer translations as it goes. This process is continuously repeated beginning with the audio data immediately after each identified pause. The packetized marked audio data 530 is then routed to a transmitter 512 that provides transmitted packets 532, preferably in accordance with the packet structures illustrated in FIGS. 2–4. The particular form of the transmitter 512 depends on the particular medium used to convey the packets. For example, where the encoder 500 resides in a network server having a wired connection to the network, such as the Internet or World Wide Web, the transmitter 512 may comprise a TCP/IP-compatible interface board or similar device. Conversely, where the encoder 500 utilizes a wireless channel, the transmitter 512 may comprise a wireless packet data-compatible transmitter.

In a preferred embodiment of the present invention, audio data 526 and pause information 524 are provided through the use of a TTS server 506. In particular, an application 502a provides text data 520 as input to a parser 504. The application 502a may comprise any source of text string data. Sample speech-based applications and developer manuals are available as part of the application developer kits from the major speech recognition and text-to-speech technology manufacturers, such as Nuance, SpeechWorks, IBM and Lernout & Hauspie. Other applications 502 are known in the art and may be readily incorporated for use with the present invention. Preferably, the text data 520 provided by the application 502a includes all indicia that may be associated with pauses. That is, data representative of punctuation marks, paragraph breaks, headings, spaces or other context-determinative information is included in the text data 520. Furthermore, the applications 502 do not need to be resident with the encoder 500.

The parser 504 analyzes the input text data 520 and selectively provides portions thereof 522 to the TTS server 506. In particular, the parser provides words, phrases, sentences, etc. to the TTS server. Based on what portions of the input text data the parser provides to the TTS, the resulting speech string is marked appropriately. For example, if a word is provided to the TTS server, the output of the TTS server is the synthesized speech for that word and the marker can mark the speech with a word pause. As another example, if the parser presents a phrase, then the result from the TTS server is a phrase and the synthesized speech is marked with a phrase pause. In the case of more complex portions of text being provided to the TTS server, opportunities may exist to mark a single location in the speech with more than one pause type. For example, if an entire sentence is provided to the TTS server, then the end of the resulting synthesized speech (preferably in digital form) could be marked with an end pause, a paragraph pause, a sentence pause, a word pause or a combination of all of these pause types. The technique described above would be most applicable in the case where the parser, marker and TTS server are not integrated. If these functions are more tightly integrated (for example, where they are included in a single software package or set of integrated software modules), then the integrated function could mark the word pauses as well as phrase or sentence pauses by recognizing the indicia corresponding to the different pause types and marking the stream of synthesized speech in real-time. Suitable implementations of the TTS server are RealSpeak software from Lernout and Hauspie, Speechify from SpeechWorks and the implementation described in Sproat (editor), "Multilingual Text-To-Speech Synthesis: The Bell Labs Approach", 1997, the teachings of which publication are incorporated herein by this reference. Additionally, the parser 504 recognizes all pause-related indicia included in the text data 520. Based on such indicia, the parser can provide pause information 524 in the form of pause types to the marker 508. For example, the occurrence of a space between words gives rise to a word-type pause, whereas a period, question mark or exclamation point gives rise to a sentence-type pause. In this manner, the marker 508 simultaneously receives audio data 526 and corresponding pause information 524 that it can associate together, as described above.

In an alternate embodiment, audio data 544 and pause information 542 are provided through the use of an audio editor 514. In particular, an application 502b provides audio data 540 to the audio editor 514. The audio data 540 is preferably recorded, digitized audio. In practice, a suitable audio editor 514 is a personal computer that executes a suitable audio processing package such as VFEdit from Voice Information Systems, VOX Studio from Parity Software or Audio Work Station from Bitworks, and Digitized Voice Programmer's Toolkit from Farpoint Software that has been modified to allow a user to identify pauses within audio data. Using the editor 514, a user can step through the audio data 514 (controlled via a control signal 541 sent to the application 502b), identify pauses, provide the pause information 542 and the corresponding audio data 544 to the marker 508 and continue on. Because this procedure requires human intervention to identify the pauses, it is most effective when performed off-line, i.e., not in real time. In this case, the marked audio 528 or packetized marked audio 530 can be stored for later retrieval.

In yet another alternate embodiment, live audio data 554 and pause information 552 corresponding thereto are provided through the use of pause analyzer 570. In particular, a live audio source 560 provides live audio data 550 to the pause analyzer 570. The live audio source 560 may comprise any source of such audio, and the live audio data 550 is preferably provided in a digital form. The pause analyzer 570 looks for pauses in the live audio data 550 by searching for periods of silence greater than a predetermined length. Techniques for identifying periods of silence in audio are well known in the art as evidenced, for example, in "The Voice Activity Detector For The Pan-European Digital Cellular Mobile Telephone Service", Freeman et al., British Telecom Res. Lab., Ipswich, UK, 1989 International Conference on Acoustics, Speech, and Signal Processing, the teachings of which publication are incorporated herein by this reference. Periods of silence are likely areas to introduce pauses, especially for voice, since periods of silence typically represent natural pauses. As it is analyzed, the live audio data 550 is passed though 554 to the marker 508. Additionally, wherever the pause analyzer 570 identifies a suitable period of silence, it also provides pause information 552 to the marker 508. Because the pause analyzer 570 will typically not be able to identify the types of pauses it locates (as in the case, for example, of the TTS server), the pause information 552 will comprise only live audio type pauses, as described above, although different lengths of pauses may be classified as different pause types.

A particular form of the embodiment employing the pause analyzer 570 incorporates the use of a Voice Activity Detector (VAD). As known in the art of telecommunications, a VAD is needed often needed to properly process speech signals. For example, in most packet-switched and compression systems, periods of silence are not encoded in the same manner as periods of voice activity as a means of reducing data rates. Thus, voice encoders (i.e., voice compression algorithms) often employ a VAD to detect periods of silence. Upon detecting silence, the encoder typically reduces the rate of transmitted packets by periodically outputting a description of the silence/background-noise, sometimes referred to as silence description (SID) packets, as opposed to higher-rate packets representing encoded silence. Thus, in one embodiment of the present invention, a voice activity detector embodies the pause analyzer 570. In this case, the pause analyzer 570 outputs audio data 554 in the form of packets and, when necessary, outputs the pause information 552 in the form of SID packets. In essence, the SID packets represent pause information without being explicitly created for that purpose. In this case, the marker 508 and packetizer 510 may not be required, depending on the form of the encoded voice and SID packets output by the analyzer 570. Thus, in this embodiment, the encoded voice 554 and SID 552 packets may be provided directly to the transmitter 512 as shown in FIG. 5. At the decoder, the receipt of one or more SID packets may be used to not only reproduce silence, but also to indicate a potential pause location in the audio stream.

Figure 6:
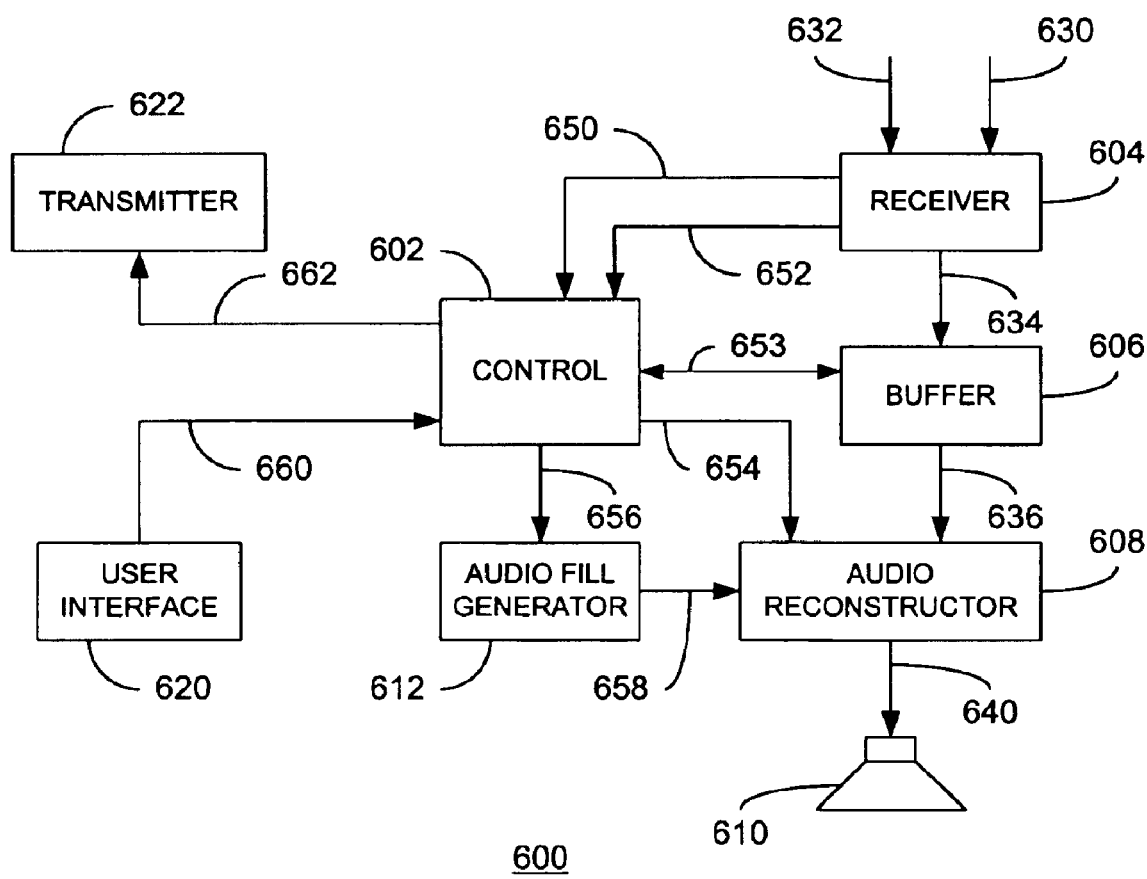
FIG. 6 is a block diagram of a decoding apparatus in accordance with the present invention.

Referring now to FIG. 6, an apparatus for decoding digitized audio that includes pause information is illustrated. The decoder 600 is included in each of the audio destinations 106. The decoder 600 comprises a controller 602 coupled to a receiver 604, buffer 606, audio reconstructor 608, an audio fill generator 612, a user interface 620 and a transmitter 622. The receiver 604 is coupled to the buffer 606 that, in turn, is coupled to the audio reconstructor 608. Likewise, the audio fill generator 612 is coupled to the audio reconstructor 608. Operation of the decoder 600 and its constituent elements is described in greater detail below. As those having ordinary skill in the art will recognize, the decoder 600 may be implemented in software, hardware or a combination of both as a matter of design choice. Furthermore, various ones of the functional elements shown in FIG. 6 may be combined together, or even further subdivided, as a matter of design choice.

The receiver 604 is compatible with the network protocol used to convey the transmitted packets 630. As with the transmitter 512, the particular form of the receiver 604 depends on the network used to convey the packets. In the case, for example, where the packets are transmitted over the Internet or World Wide Web, the receiver 604 may comprise a TCP/IP-compatible network card and corresponding software. Likewise, the receiver 604 may comprise a wireless receiver where the network is wireless. Regardless, the receiver 604 reassembles transmitted packets 630 into a digitized audio stream. This is required because the network may deliver the packets out of order or there may be packets missing. The reassembly process may include requests for retransmission of missing packets. Under error-free conditions, the digitized audio stream 634 is reassembled and stored in the buffer 606 and thereafter reconstructed for playback. Additionally, the receiver 604 strips off the pause information 652 and provides it to the controller 602. Alternatively, the pause information 652 could be stored in parallel with the audio data 634 in another buffer (not shown) accessible to the controller 602.

The buffer 606 comprises storage space residing in memory. Under normal conditions, a predetermined amount of the audio data 634 is stored in the buffer 606 before the audio reconstructor 608 is instructed to begin playback of reconstructed audio 640 through the speaker 610. In a preferred embodiment 3 seconds worth of audio data is stored in the buffer 606 prior to playback. However, it may be larger and may take advantage of the fact that speech can be transferred through the network at speeds faster than it is played out. For example, a 6.3 Kbps speech stream may be transferred through the network at 19.2 Kbps. In this case, speech can be accumulated at the decoder much more quickly than it is needed. This allows the decoder to look further into the future and determine more appropriate places to pause based on a precedence scheme described below. In the preferred embodiment, the speech buffer may hold up to 10 seconds of audio data. The audio reconstructor 608 operates upon the audio data and synthesizes an analog signal suitable for playback through the speaker 610. The particular manner in which the reconstructor 608 synthesizes the analog signal is at least partially dependent upon the format of the audio data 636. For example, where the audio data comprises 64 Kbps pulse code modulation (PCM) samples, the audio reconstructor 608 may comprise a suitable digital-to-analog (D/A) converter. Alternatively, where the audio data comprises compressed digital audio, the reconstructor 608 must first decompress the data into a suitable format for presentation to a D/A converter.

When the network is experiencing difficulty delivering the packets as a result of, for example, congestion, poor error conditions or lack of connectivity, the decoder 600 recognizes the condition and pauses playback based on pause information 652 included in the transmitted packets 630. In one embodiment, the receiver 604 receives notifications of network conditions 632. That is, the receiver 604 subscribes to and receives notifications, such as changes in quality of service, to ascertain when network performance has degraded or improved. The provision of such notifications is well known in the art and need not be described in greater detail. Upon receiving an indication of degraded service, the receiver 604 sends a message 650 to the controller 602 indicative of the degraded condition. In an alternate embodiment, the receiver 604 monitors the delivery of the transmitted packets 630 from the underlying transfer protocol. When the delivery of the packets is slowed or discontinued, the receiver 604 transmits the message 650 to the controller. In a preferred embodiment, the message 650 comprises any of a buffer underflow condition indicator, an indication of the amount of audio data remaining in the buffer, an identification of the last message received, and a starting point for next message (in case, for example, where the decoder decides to drop some packets between the last received and subsequently received). In yet another embodiment, the controller 602 may directly monitor the buffer 606, as indicated by the link 653, to determine the status of the buffer. For example, where the buffer 606 is implemented as a circular buffer with a beginning or head pointer and an end or tail pointer, the controller 602 can monitor the proximity of the two pointers. An underflow condition is detected when the pointers are too close to each other.

The controller 602, upon receiving a message 650 that a condition adversely affecting the delivery of the transmitted packets has arisen, can decide to insert one or more pauses in the reconstructed audio 640 based on the pause information 652 included in the transmitted packets 630. Referring to FIG. 6, this is accomplished by the controller 602 issuing or asserting a pause control signal 654 to the audio reconstructor 608. The control signal 654 causes the audio reconstructor 608 to discontinue playback of the audio data 636 retrieved from the buffer 606. In a preferred embodiment, pauses are inserted based on a precedence order. In particular, and referring to the pause types noted above, the controller 602 attempts to insert pauses at the speaker or topic level first, then at the heading, paragraph, or sentence level, and finally at the phrase or word level. End pauses and live audio pauses may be assigned a precedence level anywhere within this hierarchy as a matter of design choice. The pause type used is dependent on the amount of digitized speech available in the playback buffer and performance is impacted by the playback buffer size. Large buffers likely present greater opportunities to provide pauses at the preferred levels, i.e., the topic or speaker level. Conversely, small buffers likely result in more frequent pauses at the word or phrase level under poor network performance. The trade off of buffer size versus performance is a matter of design choice.

Thus, the controller 602, upon determining the need to insert one or more pauses, can inspect the pause information 652 corresponding to the audio data currently stored in the buffer 606. Using either the first available pause, or based on the precedence scheme described previously, the controller instructs the audio reconstructor 608 to halt playback for a fixed or variable length of time. That is, the controller 602 can instruct the reconstructor 608 that when its read pointer reaches a certain point, it to discontinue playback for a number of audio sample periods. It would then automatically resume after the number of periods has passed. In a preferred embodiment, the controller 602 instructs the reconstructor 608 to discontinue playback until instructed to resume playback. The latter approach is preferred because the reconstructor 608 does not have to maintain a sample counter, timer or the like. Should conditions change such that the inserted pause needs to be shortened or lengthened, the sample counter or timer would not have to be changed. Finally, an instruction to resume could include an indication to resume at a point other than where playback was discontinued. In this manner, the pause can be used to replay some speech if it is still buffered or to skip ahead. If more than one pause is to be inserted where, for example, the condition causing the delay of audio data persists, the controller 602 may instruct reconstructor 608 to resume playback after the first pause has expired and again instruct it to halt upon reaching the next available or precedent-selected pause. This process may be repeated as often as necessary, provided sufficient audio data remains in the buffer 606.

In the case, described above relative to FIG. 5, where a voice activity detector (VAD) is used to implement the pause analyzer 570, pause information is inherently transmitted in the form of silence description (SID) packets. In this case, the receiver 604 recognizes the arrival of the SID packets and indicates this to the controller 602. In this manner, the controller 602 can insert pauses at locations within the audio stream corresponding to the received SID packets.

As note above, the length of pauses inserted may be set to a predetermined length. For example, all pauses could be fixed to one second in duration. A logical extreme in this embodiment is to set the pause length as infinite so long as the condition persists. Once it is determined that the condition no longer exists, the pause would be discontinued. In a second embodiment, the length of a pause could be dependent upon the type of pause being inserted. For example, word and phrase pauses could be of a relatively short duration; heading, paragraph and sentence pauses could be longer; and speaker and topic pauses could be longer still. In a third embodiment, the lengths of pauses could be made dependent upon the amount of audio data remaining in the buffer when the condition is detected, i.e., pause duration can be inversely proportional to the amount of audio data remaining in the buffer. For example, if the buffer is at least three-quarters full, pauses can be fixed at 0.5 seconds; between one-half and three-quarters full, fixed at 1 second; between one-quarter and one-half full, fixed at 2 seconds; and less than one-quarter full, fixed at 4 seconds. Further still, combinations of these three approaches may be mixed. For example, pause duration could be made dependent upon the pause type and the amount of remaining buffered audio data.

In the case where network connectivity is lost or retransmissions are taking a very long time, additional information (audio filler) may be introduced in addition to the pause. To this end, the controller 602 issues or asserts a control signal 656 to the audio fill generator 612. The control signal 656 instructs the generator 612 to generate audio filler data 658 and, optionally, what type of data to generate. For example, the audio filler may comprise a speech prompt indicating the existence of a temporary network difficulty. Alternatively, the filler data may comprise other information such as ads, music or comfort noise; the present invention is not limited in this regard. The audio filler data 658 is rendered audible by the audio reconstructor 608 in the same manner described above.

In the case where there is buffer underflow, i.e., packets are not arriving at the receiver 604 quickly enough, the controller 602, via the transmitter 622, may also send a request to the audio source indicating it should jump ahead or speed up transfer if possible. This is not strictly necessary since the controller 602 will have already caused a pause and may just await the arrival of additional packets. If the buffer is emptied before completion of the speech stream, then it will insert a pause and resume playback only after the predetermined amount of audio data has again been accumulated or the audio stream end is reached as determined, for example, by an end-type pause indication. Note that the transmitter 622 available to the decoder 600 is essentially identical to the transmitter 512 available to the encoder 500.

In the case where there is buffer overflow, i.e., the packets are arriving at the receiver 604 too quickly, the controller 602, via the transmitter 622, may send a message to the audio source indicating that it should stop transmitting or that the transfer rate should be adjusted or both. As a corollary to this scenario, in the case where intermediate packets are lost, the controller 602 may instruct the audio source to discontinue attempts to deliver the lost packets thereby allowing the audio playback to move beyond the audio data temporarily causing difficulty. As the speech buffer is emptied, the controller 602 can request the audio source to resume the transfer process in order to replenish the supply of audio data. In the preferred embodiment, such a request is sent when the speech buffer is 50% full for a buffer 10 seconds in length. This will generally result in no less than 3 seconds of speech in the buffer, as preferred.

If the delaying condition is long enough, or where the network connection has been completely lost, the information currently in the buffer 606 may become stale or obsolete. In this case, the controller 602 (upon expiry, for example, of a time-out timer) may send an abort request to the audio source and to the audio fill generator 612 causing an abort message to be played out the speaker 610. Additionally, the controller may also purge the buffer 606, for example, by overwriting the data in the buffer 606 or by resetting the appropriate buffer pointers. In the event of a lost network connection, the controller 602 causes the abort message to be played, purges the buffer 606 and instructs the receiver 604 to reject further packets from the audio source related to that connection and request a restart of the network connection, thereby re-synchronizing the audio source and the decoder 600.

Using the same mechanisms described above, the controller 602 also detects when the condition requiring the insertion of pauses has been alleviated or otherwise discontinued. For example, the controller 602, via the receiver 604, may receive a network notification indicating that the quality of service has improved. Alternatively, the receiver 604, by monitoring the delivery of audio packets, may ascertain that the underlying transfer protocol is again delivering the packets at a sufficient rate. Regardless, the controller 602 instructs the audio reconstructor 608 to resume playback of the audio data 636 stored in the buffer, preferably beginning at the point where the last pause was inserted.

The pause information 652 enables a variety of other features. For example, a user can control when pauses are introduced. As the audio data is reconstructed, a user can request, via the user interface 620, that the playback pause and subsequently resume. The pause request causes the controller 602 to pause the playback at a pause of the specified type for a predetermined period of time or until told to resume playback. Optionally, the controller 602 would transmit a request to the audio source instructing it to temporarily halt transmission of packets for the predetermined period of time or until a subsequent request for continued transmission is received. Note that the user interface 620 may comprise any conventional user input device, e.g., alphanumeric keypad, touch screen, mouse and pointer display, drop-down menus, voice activation, etc.

In addition, the controller 602, in response to a user request, could instruct the audio reconstructor 608 to repeat the previous sentence, paragraph, heading, topic or speaker as determined by the appropriate pause type. This implies that the buffer 606 is large enough to hold the previously played out audio. In the event that it is not large enough, the controller 602 can either request retransmission of the last sentence, paragraph, heading, topic or speaker, or it can cause the audio fill generator 612 to play a message that it cannot satisfy the current request. Further still, the controller 602, in response to a user request, can instruct the audio reconstructor 608 to skip to the next sentence, paragraph, heading, topic or speaker as identified by the pause information 652. Assuming such data is available in the buffer 606, the current playback would be aborted and the new audio data would be played out to the speaker 610.

The present invention provides a technique for mitigating the effects of network delays on reconstructed audio through the use of pause information added to the transmitted audio data. Pause information is used to intelligently add pauses to the reconstructed audio upon detection of conditions indicative of a temporary delay or discontinuation of the audio data. In this manner, unusual artifacts and discontinuities in the reconstructed audio are avoided, while simultaneously allowing the temporary condition to be alleviated. What has been described is merely illustrative of the application of the principles of the present invention. Those skilled in the art can implement other arrangements and methods without departing from the spirit and scope of the present invention.

What is claimed is:

1. A method for decoding digitized audio, wherein pause information has been added to the digitized audio, the pause information identifying pause types and locations of one or more pauses occurring in audio information included in the digitized audio, the method comprising steps of:

receiving the digitized audio;

providing reconstructed audio based on the digitized audio;

detecting a condition requiring at least temporary discontinuation of the reconstructed audio;

in response to detecting the condition, inserting one or more additional pauses into the reconstructed audio corresponding to the pause types and locations identified by the pause information.

2. The method of claim 1, wherein the step of detecting further comprises detecting impairment to continued receipt of the digitized audio.

3. The method of claim 1, wherein the step of detecting further comprises receiving a request to discontinue the reconstructed audio.

4. The method of claim 1, further comprising steps of: determining that the condition is no longer valid; and continuing provision of the reconstructed audio.

5. The method of claim 1, wherein the step of selectively inserting further comprises pausing the reconstructed audio for a predetermined period of time, the method further comprising a step of:

continuing provision of the reconstructed audio upon expiry of the predetermined period of time.

6. The method of claim 5, wherein the pause information comprises at least one pause type, and length of the predetermined period of time is based on the at least one pause type.

7. The method of claim 1, further comprising a step of:

storing a predetermined amount of the digitized audio in a buffer prior to the step of providing the reconstructed audio, wherein the reconstructed audio is based on the digitized audio stored in the buffer, and wherein the step of selectively inserting further comprises pausing the reconstructed audio for a period of time based on the amount of digitized audio remaining in the buffer.

8. The method of claim 1, wherein the step of selectively inserting further comprises:

identifying a pause location in the digitized audio;

continuing provision of the reconstructed audio up to the pause location; and pausing provision of the reconstructed audio once the pause location has been reached.

9. The method of claim 1, wherein the pause information comprises at least one pause type corresponding to the locations.

10. The method of claim 9, wherein the step of selectively inserting further comprises pausing for a period of time based on the pause type.

11. The method of claim 9, wherein the at least one pause type comprises any of a group consisting of a word pause, a phrase pause, a sentence pause, a paragraph pause, a heading pause, a topic pause, a speaker pause, an end pause and any suitable combination of the foregoing.

12. The method of claim 1, wherein the pause information comprises silence description packets.

13. The method of claim 1, further comprising a step of: providing filler audio while pausing the reconstructed audio.

14. A computer-readable medium having computer-executable instructions for performing the steps of claim 1.

15. An apparatus for decoding digitized audio, wherein pause information has been added to the digitized audio, the pause information identifying pause types and locations of one or more pauses occurring in audio information included in the digitized audio, the apparatus comprising:

a controller;

a receiver, coupled to the controller, that receives the digitized audio and the pause information and that stores the digitized audio in an audio buffer; an audio reconstructor, coupled to the controller and the audio buffer, that provides reconstructed audio based on the digitized audio stored in the audio buffer, wherein the controller detects a condition requiring at least temporary discontinuation of the reconstructed audio and, in response to the condition, instructs the audio reconstructor to additionally pause the reconstructed audio at one or more instants corresponding to the pause types and locations identified by the pause information.

16. The apparatus of claim 15, wherein the condition detected by the controller is an impairment to continued receipt of the digitized audio.

17. The apparatus of claim 15, further comprising:
a user interface coupled to the controller,
wherein the condition detected by the controller is a request to discontinue the reconstructed audio received via the user interface.

18. The apparatus of claim 15, wherein the controller instructs the audio reconstructor to pause for a predetermined period of time.

19. The apparatus of claim 18, wherein the pause information comprises at least one pause type, and length of the predetermined period of time is based on the at least one pause type.

20. The apparatus of claim 15, wherein the controller instructs the audio reconstructor to pause for a period of time that is based on the amount of digitized audio remaining in the buffer.

21. The apparatus of claim 15, wherein the pause information comprises at least one pause type corresponding to the locations, and wherein the controller instructs the audio reconstructor to pause based on the at least one pause type.

22. The apparatus of claim 15, further comprising:
an audio fill generator, coupled to the controller and the audio reconstructor,
wherein the controller instructs the audio fill generator to provide filler audio to the audio reconstructor while pausing the reconstructed audio.

23. A client in a client-server communication system comprising the apparatus of claim 15.

24. The client of claim 23, wherein the receiver is a wireless receiver.

25. A system for marking pauses in digitized audio comprising:
a voice activity detector, that takes the digitized audio as input and identifies at least one period of silence longer than a predetermined length within the digitized audio;
an encoder that provides the digitized audio as output, and that provides silence description information as output when the voice activity detector identifies the at least one period of silence;
a transmitter, coupled to the encoder, that transmits the digitized audio and the silence description information;
a receiver, in communication with the transmitter that receives the digitized audio and the silence description information from the transmitter;
an audio reconstructor, coupled to the receiver, that provides reconstructed audio based on the digitized audio; and
a controller, coupled to the receiver, that at least temporarily discontinues provision of the reconstructed audio and instructs the audio reconstructor to additionally pause the reconstructed audio based on a pause type and a pause location included in the silence description information.

26. A method for decoding digitized audio, wherein pause information has been added to the digitized audio, the pause information including at least one pause type, the method comprising steps of:
receiving the digitized audio;
providing reconstructed audio based on the digitized audio;
detecting a condition requiring at least temporary discontinuation of the reconstructed audio;
pausing provision of the reconstructed audio for a predetermined period of time in response to detecting the condition, the length of the predetermined period of time being based on the at least one pause type included in the pause information; and
continuing provision of the reconstructed audio upon expiry of the predetermined period of time.

27. The method of claim 26, wherein the step of detecting further comprises detecting impairment to continued receipt of the digitized audio.

28. The method of claim 26, wherein the step of detecting further comprises receiving a request to discontinue the reconstructed audio.

29. The method of claim 26, further comprising steps of:
determining that the condition is no longer valid; and
continuing provision of the reconstructed audio.

30. The method of claim 26, further comprising a step of:
storing a predetermined amount of the digitized audio in a buffer prior to the step of providing the reconstructed audio,
wherein the reconstructed audio is based on the digitized audio stored in the buffer,
and wherein the step of pausing further comprises pausing for a period of time based on the amount of digitized audio remaining in the buffer.

31. The method of claim 26, wherein the at least one pause type comprises any of a group consisting of a word pause, a phrase pause, a sentence pause, a paragraph pause, a heading pause, a topic pause, a speaker pause, an end pause and any suitable combination of the foregoing.

32. The method of claim 26, wherein the pause information comprises silence description packets.

33. The method of claim 26, further comprising a step of: providing filler audio while pausing the reconstructed audio.

34. A computer-readable medium having computer-executable instructions for performing the steps of claim 26.

35. The method of claim 26, wherein the pause information further comprises at least one pause location within the digitized audio, and wherein the step of pausing further comprises:
identifying a pause location of the at least one pause location;
continuing provision of the reconstructed audio up to the pause location; and
pausing provision of the reconstructed audio once the pause location has been reached.

36. The method of claim 35, wherein the at least one pause type corresponds to the at least one pause location, wherein the step of identifying further comprises identifying the pause location based on the at least one pause type corresponding to the pause location.

37. A method for decoding digitized audio, wherein pause information has been added to the digitized audio, the pause information including at least one pause type corresponding to at least one pause location within the digitized audio, the method comprising steps of:
- receiving the digitized audio;
- providing reconstructed audio based on the digitized audio;
- detecting a condition requiring at least temporary discontinuation of the reconstructed audio;
- identifying a pause location based on the at least one pause type;
- continuing provision of the reconstructed audio up to the pause location; and
- in response to detecting the condition, pausing, at least temporarily, provision of the reconstructed audio once the pause location has been reached.

38. The method of claim 37, wherein the step of detecting further comprises detecting impairment to continued receipt of the digitized audio.

39. The method of claim 37, wherein the step of detecting further comprises receiving a request to discontinue the reconstructed audio.

40. The method of claim 37, further comprising steps of: determining that the condition is no longer valid; and continuing provision of the reconstructed audio.

41. The method of claim 37, wherein the step of pausing further comprises pausing for a predetermined period of time, the method further comprising a step of:
- continuing provision of the reconstructed audio upon expiry of the predetermined period of time.

42. The method of claim 41, wherein the length of the predetermined period of time is based on the at least one pause type.

43. The method of claim 37, further comprising a step of:
- storing a predetermined amount of the digitized audio in a buffer prior to the step of providing the reconstructed audio,
- wherein the reconstructed audio is based on the digitized audio stored in the buffer,
- and wherein the step of pausing further comprises pausing for a period of time based on the amount of digitized audio remaining in the buffer.

44. The method of claim 37, wherein the step of pausing further comprises pausing for a period of time based on the at least one pause type.

45. The method of claim 37, wherein the at least one pause type comprises any of a group consisting of a word pause, a phrase pause, a sentence pause, a paragraph pause, a heading pause, a topic pause, a speaker pause, an end pause and any suitable combination of the foregoing.

46. The method of claim 37, wherein the pause information comprises silence description packets.

47. The method of claim 37, further comprising a step of: providing filler audio while pausing the reconstructed audio.

48. A computer-readable medium having computer-executable instructions for performing the steps of claim 37.

49. An apparatus for decoding digitized audio, wherein pause information has been added to the digitized audio, the pause information including at least one pause type, the apparatus comprising:
- a controller;
- a receiver, coupled to the controller, that receives the digitized audio and the pause information and that stores the digitized audio in an audio buffer;
- an audio reconstructor, coupled to the controller and the audio buffer, that provides reconstructed audio based on the digitized audio stored in the audio buffer, wherein the controller detects a condition requiring at least temporary discontinuation of the reconstructed audio and, in response to the condition, instructs the audio reconstructor to pause the reconstructed audio for a predetermined period of time, the length of the predetermined period of time being based on the at least one pause type included in the pause information.

50. The apparatus of claim 49, wherein the condition detected by the controller is an impairment to continued receipt of the digitized audio.

51. The apparatus of claim 49, further comprising:
- a user interface coupled to the controller,
- wherein the condition detected by the controller is a request to discontinue the reconstructed audio received via the user interface.

52. The apparatus of claim 49, wherein the controller instructs the audio reconstructor to pause for a period of time that is based on the amount of digitized audio remaining in the buffer.

53. The apparatus of claim 49, wherein the pause information further comprises at least one pause location, and wherein the controller instructs the audio reconstructor to pause based on the at least one pause location.

54. The apparatus of claim 49, wherein the at least one pause type corresponds to at least one pause location.

55. The apparatus of claim 49, further comprising:
- an audio fill generator, coupled to the controller and the audio reconstructor, wherein the controller instructs the audio fill generator to provide filler audio to the audio reconstructor while pausing the reconstructed audio.

56. A client in a client-server communication system comprising the apparatus of claim 49.

57. The client of claim 56, wherein the receiver is a wireless receiver.

58. An apparatus for decoding digitized audio, wherein pause information has been added to the digitized audio, the pause information including at least one pause type corresponding to at least one pause location, the apparatus comprising:
- a controller;
- a receiver, coupled to the controller, that receives the digitized audio and the pause information and that stores the digitized audio in an audio buffer;
- an audio reconstructor, coupled to the controller and the audio buffer, that provides reconstructed audio based on the digitized audio stored in the audio buffer, wherein the controller detects a condition requiring at least temporary discontinuation of the reconstructed audio and, in response to the condition, instructs the audio reconstructor to pause the reconstructed audio based on the at least one pause type corresponding to the at least one pause location.

59. The apparatus of claim 58, wherein the condition detected by the controller is an impairment to continued receipt of the digitized audio.

60. The apparatus of claim 58, further comprising:
- a user interface coupled to the controller,
- wherein the condition detected by the controller is a request to discontinue the reconstructed audio received via the user interface.

61. The apparatus of claim 58, wherein the controller instructs the audio reconstructor to pause for a predetermined period of time.

62. The apparatus of claim 61, wherein the length of the predetermined period of time is based on the at least one pause type.

63. The apparatus of claim 58, wherein the controller instructs the audio reconstructor to pause for a period of time that is based on the amount of digitized audio remaining in the buffer.

64. The apparatus of claim 58, wherein the controller instructs the audio reconstructor to pause based on the at least one pause location.

65. The apparatus of claim 58, further comprising:

an audio fill generator, coupled to the controller and the audio reconstructor, wherein the controller instructs the audio fill generator to provide filler audio to the audio reconstructor while pausing the reconstructed audio.

66. A client in a client-server communication system comprising the apparatus of claim 58.

67. The client of claim 66, wherein the receiver is a wireless receiver.

* * * * *